April 16, 1957 — L. D. STATHAM — 2,789,190
MOTION SENSING DEVICE
Filed May 17, 1954 — 2 Sheets-Sheet 1

INVENTOR
LOUIS D. STATHAM
BY
ATTORNEY.

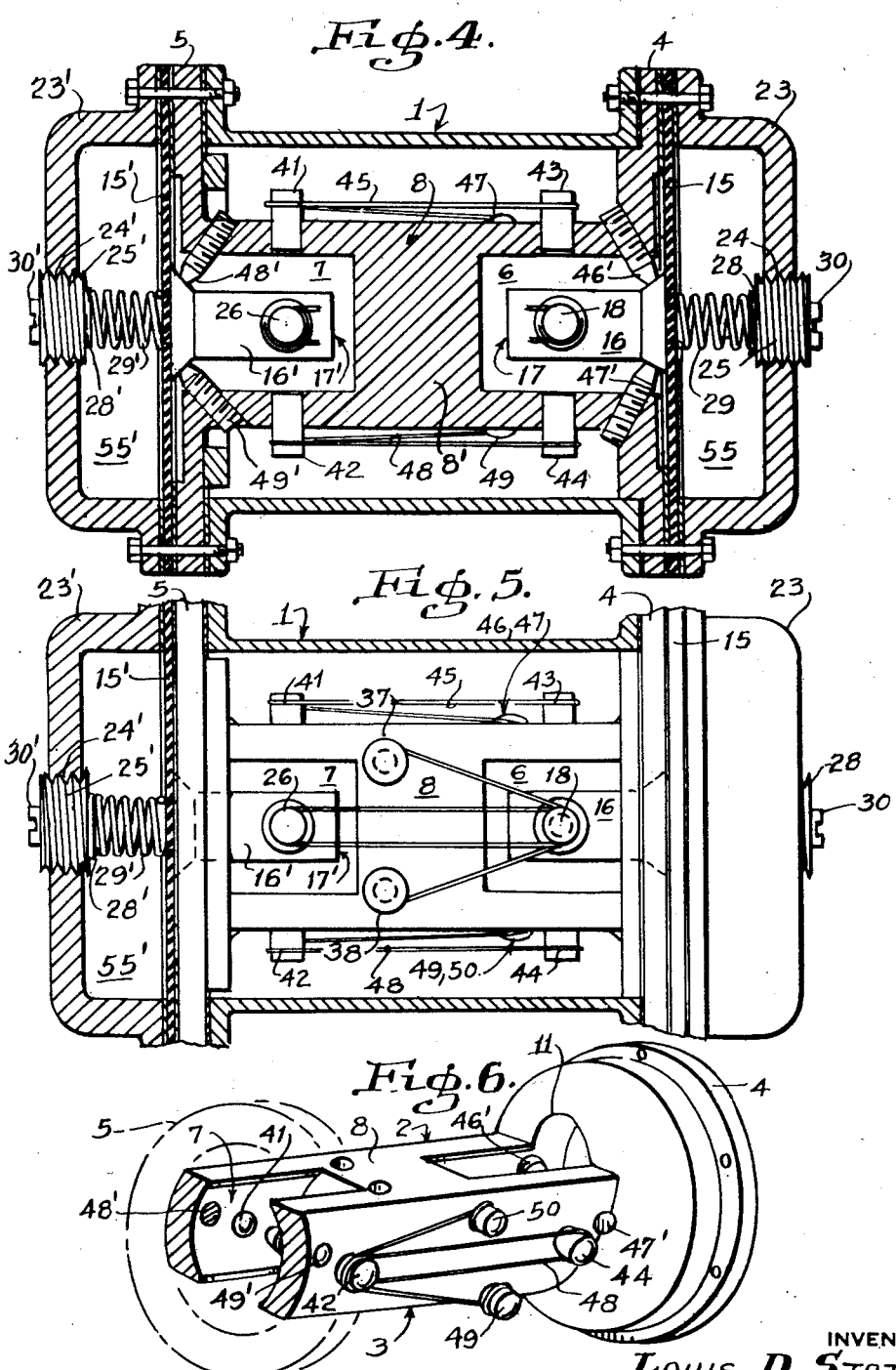

United States Patent Office 2,789,190
Patented Apr. 16, 1957

2,789,190

MOTION SENSING DEVICE

Louis D. Statham, Beverly Hills, Calif., assignor to Statham Laboratories, Inc., Los Angeles, Calif., a corporation of California Application May 17, 1954, Serial No. 430,228

11 Claims. (Cl. 201—48)

This application is a continuation-in-part of my co-pending application Serial No. 354,295, filed May 11, 1953 and 386,315 filed October 15, 1953.

This invention relates to a switch or transducer which may be employed as a motion sensing device and is particularly designed to faithfully respond to or report the motion and degree of motion to be sensed but is insensitive to acceleration. This is particularly useful where the force or motion to be measured or sensed is not related to acceleration of the switch or transducer. Where the motion sensing device is itself a seismic system, i. e., includes a mass mounted for oscillatory movement upon a spring, the acceleration of the switch or transducer will cause a movement of the spring mass. Since the force or motion to be sensed also produces a like movement of the spring mass, the instrument is incapable of discriminating between the force or motion induced by acceleration and that caused by the motion or force it is designed to sense.

For many purposes, however, it is desirable in a motion or force sensing device that the device be insensitive to acceleration. An example of such a device is a pressure gage in an accelerating vehicle, i. e., an airplane. In such a pressure gage the pressure transmitting medium, i. e., a diaphragm mounted in a container, is connected to and actuates a transducer capable of sensing the movement of the diaphragm upon the application of pressure in the container and against the diaphragm. Since the diaphragm and the transducer have mass, the acceleration of the vehicle in which the pressure gage is mounted causes a like acceleration of the case of the gage. Due to the inertia of the diaphragm and the parts connected to the diaphragm capable of motion relative to the case, there is a motion of the diaphragm and connected parts relative to the case. Since this motion is indistinguishable from a like motion resulting from imposition of pressure, an error is introduced into the instrument. This same problem is also present where the transducer measures a movement of the diaphragm or other resilient suspension induced by any other force. The movable member of the transducer and its associated mechanism having mass, the acceleration of the case in which the transducer is mounted, i. e., as a result of the acceleration of the vehicle in which the case is mounted, will cause a deflection of the movable member with respect to the case, and the instrument will then read in error by the amount of this deflection of the movable member.

One object of my invention is to provide a motion sensing device which is substantially unaffected by acceleration forces.

It is another object of my invention to devise a transducer in which acceleration effects do not introduce any susbtantial error into the reading of the transducer.

It is still another object of my invention to devise a transducer which is substantially insensitive to the effect of acceleration.

In my co-pending application, Serial No. 354,295, is described a device for accomplishing the foregoing objects. This device is in the form of a transducer having a relatively fixed member upon which two movable members are mounted, i. e., movable in relation to each other and to the fixed member, one of them so movable upon the application of a force or motion to be sensed, but substantially immovable with respect to each other, i. e., functionally rigidly connected when subjected to acceleration.

In one form of this transducer is employed a plurality of seismic systems, each composed of a spring mass. Means are provided for connecting one of the masses to the motion or force to be sensed by the transducer. A motion sensing device is connected to the two masses in such manner that the approach or departure of the masses from each other may be sensed by the device. The masses are mounted on or in a resilient suspension on a framework. In such a structure the masses may be made to deflect on the framework equally and in unison upon acceleration of the frame, and thus no relative motion of the masses is indicated by the transducer. However, if a force or motion is applied to one only of the masses, as by a rod or by a pressure, a relative motion of the masses with respect to each other will occur. The mass of each of said resiliently mounted masses or the spring rate of their resilient suspension or both are preferably adjusted so that the natural frequency of each of the spring masses is substantially the same. The spring rate of the resilient suspension is also desirably adjusted so that the amplitude of deflection upon the application of an accelerating or oscillating force will be substantially the same. This may be desirably accomplished by adjusting the masses and also the spring rate of each of the resiliently suspended members substantially the same so that the natural frequency, the amplitude of oscillation, and the damping coefficient of each of the spring masses are the same.

In consequence of such adjustment of these parameters of design, on the imposition of an oscillatory force or any variable force such as acceleration upon the transducer, the relatively movable masses will be displaced upon their resilient suspension equally and in phase and at the same frequency so that their relative positions with respect to each other will be unchanged. These masses thus act as if they were rigidly connected. However, by applying a force other than acceleration or oscillation of the transducer, for example, to one of the movable members, they may be caused to approach or depart from each other.

While the device of application Serial 354,295 has proven satisfactory, the structure of the instant improvement is designed with the particular view of rendering the device of such application more insensitive to acceleration when it is desired to sense a force or motion produced by liquid pressure, and thus increasing the accuracy of the device for sensing such motion or force. In the device of the said co-pending application, when liquid pressure is applied against one of the spring masses or diaphragms thereof, and a simultaneous acceleration of the device takes place, the force produced by the acceleration of the liquid pressure body in contact with such diaphragm can produce a displacement of this diaphragm due to such acceleration, and hence introduce an error into the force or motion provided by the liquid pressure which is desired to be sensed. This does not occur in the device of the said co-pending application where the force it is desired to sense is that induced by gas pressure, since the force produced by acceleration of the gas body in contact with a diaphragm of such device is practically zero.

The above noted error introduced in the co-pending application device during sensing of a force induced by liquid pressure on simultaneous acceleration of the instrument, is obviated according to the instant invention by incorporating in a transducer such as that of the said co-pending application a liquid pressure connection in the form of a loop having a liquid pressure source, one end of such connection being connected to one of the aforementioned spring masses or diaphragms, and the other end being connected to the other spring mass or diaphragm. This introduces substantially equal bodies or quantities of liquid adjacent both diaphragms, so that when sensing the motion of the diaphragms produced by the force of such liquid pressure, simultaneous acceleration of the liquid will not cause additional movement of one or the other of such diaphragms as a result of such acceleration, and the system will be balanced in this respect substantially eliminating any errors on this account.

In a preferred embodiment of my invention, illustrated and described herein, I construct a transducer in the form of an electrical variable resistance strain wire gage comprising a frame, a pair of flexible members, i. e., a pair of diaphragms, mounted in parallel and spaced arrangement on the framework. Upon each of the opposing faces of the diaphragms I mount a structure in which pins may be mounted and strain wires are stretched under tension between the pins on one of the diaphragms and the pins on the other of the diaphragms. The force to be measured is applied in the form of liquid pressure to opposite sides of each of the diaphragms by means of a conduit in the form of a preferably symmetrical loop connected to the frame and communicating with pressure chambers at opposite ends of the frame adjacent the respective diaphragms. This force causes the pins to approach each other or depart from each other as a result of the deflection of the diaphragms. The variation in strain in the wire resulting from the motion of the diaphragms is determined by the conventional electrical arrangement common to strain wire gages. However, if the framework is caused to oscillate or accelerate, the two diaphragms are deflected in phase and synchronism and equally, so that no variation in the separation of the pins occurs and no variation in strain of the wire results.

These and other objects of the invention will be further described by reference to the drawings, in which Fig. 1 is a vertical section through the transducer with parts in elevation;

Fig. 4 is a section taken on line 4—4 of Fig. 1;

Fig. 5 is a view similar to Fig. 4 showing only certain parts in section; and

Fig. 6 is a detail in perspective with parts broken away.

Figure 1:
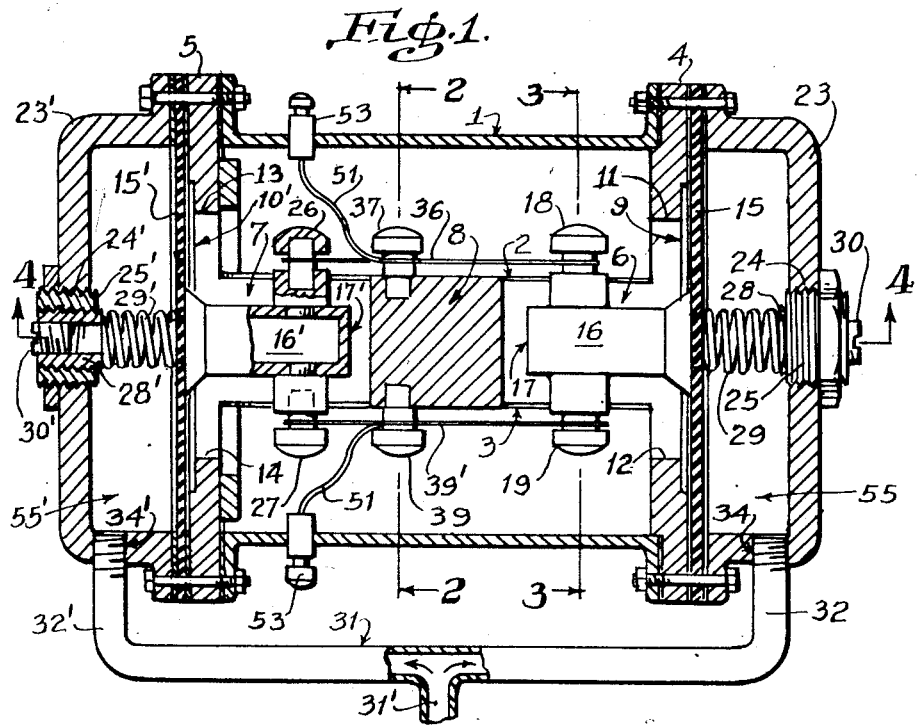
Figure 2:
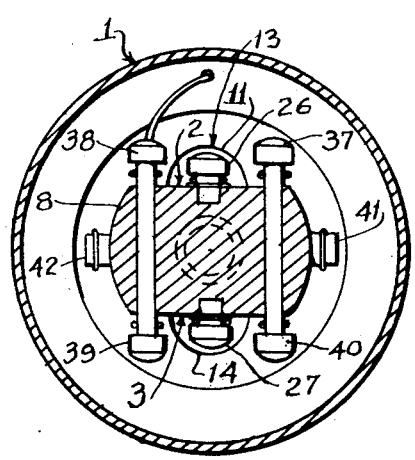
Fig. 2 is a section taken on line 2—2 of Fig. 1.
Figure 3:
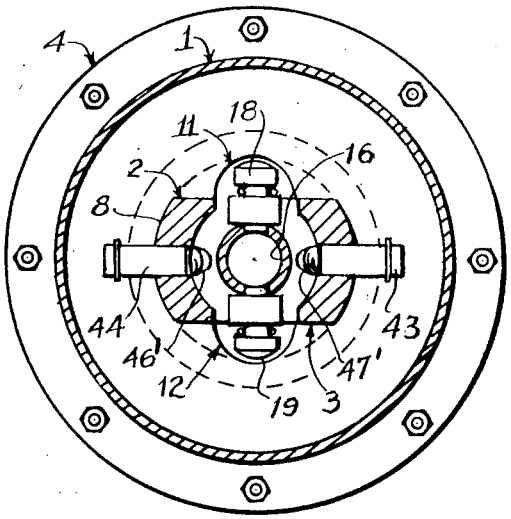
Fig. 3 is a section taken on line 3—3 of Fig. 1.

Cylindrical frame 8 positioned in the instrument housing 1 is squared off at the top 2 and bottom 3 to give parallel faces, and carries circular end flanges 4 and 5. The ends of the frame 8 are counterbored at 6 and 7 to form recesses which are separated by a wall 8', as seen more clearly in Fig. 4. The flanges 4 and 5 are counterbored at 9 and 10 to form diaphragm chambers, as will be described below. The recess 6 is intercepted by slot 11 positioned in the upper face 2 of the frame and in the flange 4, and also by a slot 12 in the lower face 3 of the frame and in the flange 4. A slot 13 intercepting the recess 7 is provided in the upper face 2 of the frame 8 and in the flange 5, and a slot 14 intercepting the recess 7 is provided in the lower face 3 of the frame 8 and in the flange 5.

The diaphragm 15 is secured at its periphery to the flange 4 over the diaphragm chamber 10 to seal the chamber by suitable means such as welding the edge of the diaphragm to the flange. Mounted centrally of the diaphragm 15 is a hollow post 16 having an end closure 17 and carrying two diametrically opposed pins 18 and 19 axially aligned with their axes perpendicular to the axis of the hollow post 16. Pin 18 extends through the slot 11 and pin 19 extends through the slot 12. A pressure cap or casing 23 is mounted on the flange 4 and clamps the diaphragm 15 between the cap and flange 4 by suitable bolts or studs. The cap is bored at 24 and tapped to receive an internally and externally threaded sleeve 25 which is screwed into the bore 24 and over an internally and externally threaded hollow stud 28 which carries attached at the end thereof a spring 29, one end of which is secured by soldering to the diaphragm 15. The hollow stud 28 is sealed by a plug 30.

Diaphragm 15' is also secured at its periphery to flange 5 over the diaphragm chamber 10' in the same manner that diaphragm 15 is attached to flange 4. Mounted centrally of the diaphragm 15' is a hollow post 16' axially aligned with post 16, and having an end closure 17' and carrying pins 26 and 27 which are mounted on 16' parallel to the pins 18 and 19. Pins 26 and 27 are axially aligned and are perpendicular to the axis of post 16'. Pin 26 extends through the slot 13 and pin 27 extends through the slot 14. A pressure cap 23' is mounted on flange 5, clamping diaphragm 15' in place as in the case of diaphragm 15. Cap 23' is also bored at 24' and provided therein with an internally and externally threaded sleeve 25' screwed over a threaded hollow stud 28' carrying at the end thereof a spring 29' one end of which is secured to diaphragm 15', the hollow stud 28' being provided with a plug 30'. It is seen that the structure including diaphragm 15' and its associated elements is the same as the structure of diaphragm 15 and its associated elements.

Electrical resistance strain wires 36 are looped around the insulating pins 26 and 18 under tension and connected to the insulated terminals 37 and 38, and electrical strain wires 39' are looped under tension around insulating pins 27 and 19 and connected to insulated terminals 39 and 40. Insulated pins 41 and 42 are axially aligned in the frame 8 and disposed 90° to the insulated pins 26 and 27, and insulated pins 43 and 44 are positioned in the frame 8 parallel to the pins 41 and 42. Strain wires 45 are mounted on pins 41 and 43 and are connected to insulated terminals 46 and 47, and strain wires 48 are mounted on pins 42 and 44, and connected to insulated terminals 49 and 50. The ends of the respective wires are connected by insulated conductors 51 to terminals 53 in the form of a Wheatstone bridge, with the two wires 45 and 48 fixed or inactive while the wires 36 and 39' are active, that is, variable in resistance upon the approach or departure from each other of pins 18 and 26, or the approach or departure from each other of pins 19 and 27, as pressure is increased or decreased upon the diaphragms 15 and 15'. The angularly disposed screws 46', 47', 48' and 49' are stops to limit the deflection of the diaphragm to prevent overloading when excessive pressure is accidently applied in the manner described below.

A conduit 31 in the form of a planar loop has each of its ends 32 and 32' threadedly connected to tapped and threaded portions 34 and 34' in caps 23 and 23'. Conduit 31 has an inlet 31' communicating with the central portion of the loop, through which inlet liquid pressure is applied from a pressure source. Thus, one end 32 of the loop communicates with pressure chamber 55 adjacent the outer side of diaphragm 15 and the other end 32' of the loop communicates with pressure chamber 55' adjacent the outer side of diaphragm 15'. The loop or conduit 31 is U-shaped and preferably symmetrical, although it may have any desired shape. The distance between the ends 32 and 32' of the loop measured along the longitudinal axis of the instrument should be as short as possible to decrease the effect on the device of forces induced by acceleration thereof.

To assemble the device the frame 8 with diaphragms 15 and 15' and their associated structures disposed in properly spaced relation are wound by winding the wires 36, 39', 45 and 48 on the pins and making the suitable connections. When winding is completed case 1 is positioned about this assembly and the proper electrical connections made. Caps 23 and 23' are then connected in place and sleeves 25 and 25' screwed into position. Plugs 30 and 30' are then screwed into position in hollow studs 28 and 28'. Conduit 31 is next secured at its ends 32 and 32' to pressure caps 23 and 23'.

The weight of the diaphragm 15 and the members 16, 18, and 19 supported thereon is made substantially equal to the weight of the diaphragm 15' and the structure supported on this diaphragm, to wit, post 16' and the pins 26 and 27. Thus, the weight of the diaphragm 15 and the members supported thereon equals the weight of the diaphragm 15' and the members supported on the diaphragm 15'.

The threaded studs 28 and 28' may be manipulated to adjust the tension of springs 29 and 29' so as to adjust the position of the diaphragms 15 and 15' and to produce a substantially equal spring rate for the mass of structure including the diaphragm 15 and for the mass of structure including the diaphragm 15'. The conduit 31 is filled with a liquid, the pressure or force of which is to be sensed by my device.

When pressure is imposed through inlet 31' and conduit 31 into chambers 55 and 55', equal and opposite pressures are applied against diaphragms 15 and 15' by the liquid in chambers 55 and 55'. This causes both diaphragms 15 and 15' to deflect inwardly a substantially equal amount. The diaphragms are mechanically isolated from each other in the sense that the motion of the diaphragm 15 is not imparted to diaphragm 15' since the strain wires will not transmit a compressive force, the inward motion of the diaphragms 15 and 15' acting merely to relieve the tension introduced in the original winding of the wires. The pins 18 and 19 approach the pins 26 and 27, and with the proper electrical circuits, as will be understood by those skilled in the art, this variation in tension of the wires may be made to indicate the degree of pressure exerted.

However, if the instrument case 1 and its associated structure is subjected to acceleration, the transducer will be insensitive to such acceleration because diaphragms 15 and 15' will be subjected to equal acceleration pressures imposed by the bodies of liquid in opposite pressure chambers 55 and 55' and these axial inertial forces will displace the diaphragms in the same direction by the same amount depending on the direction of acceleration. Thus, the diaphragms 15 and 15' will deflect synchronously and at the same frequency and at the same amplitude. The amplitude and the frequency at which the diaphragms will deflect may be adjusted by adjusting the tension or compression in the springs 29 and 29' by adjusting screws 28 and 28', so that the diaphragms will deflect equally and in the same direction. Under these circumstances the separation of pin 26 from pin 18 and the separation of pin 27 from pin 19 is unaltered as regards the inertial forces of acceleration.

While the principles of the invention have been described chiefly in relation to their application in a transducer, these principles are likewise applicable in switches, e. g., of the type used in airplanes, and which are subjected to large values of acceleration, introducing the possibility that the switch will close or open at such times contrary to its real purpose. In my co-pending application Serial No. 430,072, filed of even date herewith, is described and claimed a switch mechanism actuated by fluid pressure and embodying the major principle of this invention, namely, a liquid pressure loop communicating with chambers on opposite sides of the two diaphragms on which the respective pole pieces are mounted. This switch structure renders the switch insensitive not only to the force produced by acceleration of the switch case, but to the force produced by acceleration of the body of liquid in contact with the diaphragms.

While I have described a particular embodiment of my invention for the purpose of illustration, it should be understood that various modifications and adaptations thereof may be made within the spirit of the invention as set forth in the appended claims.

I claim:

1. A motion sensing device which comprises a frame, a first diaphragm mounted on said frame, a second diaphragm mounted on said frame in parallel alignment with said first mentioned diaphragm, motion sensing means connected to said diaphragms, a pressure chamber adjacent each of said diaphragms, said pressure chambers having substantially the same volume, a liquid pressure conduit in the form of a loop connected across the ends of said frame, one end of said conduit communicating with one of said pressure chambers and a side of the adjacent diaphragm, the other end of said conduit communicating with the other pressure chamber and the opposite side of said second diaphragm, and liquid in said loop and said pressure chambers.

2. A transducer comprising a frame, a diaphragm mounted on said frame, a wire mounting connected to said diaphragm, an electrical resistance strain wire connected to said wire mounting, a second resilient connection between said wire and said frame, a spring mounted in said frame, said spring being connected to said diaphragm, means for adjusting said spring, a liquid pressure connection on said frame, one end of said connection communicating with said diaphragm and the other end of said connection communicating with said second resilient connection, and liquid in said pressure connection.

3. A transducer comprising a frame, a first diaphragm mounted on said frame, a second diaphragm mounted on said frame spaced from said first-mentioned diaphragm, a wire mounting connected to each of said diaphragms, an electrical resistance strain wire stretched in tension between and mounted upon said wire mountings, a spring bias for both of said diaphragms, a liquid pressure conduit in the form of a loop connected across the ends of said frame, one end of said conduit communicating with a side of one of said diaphragms, the other end of said conduit communicating with the opposite side of said second diaphragm, and liquid in said loop.

4. A transducer comprising a frame, a first diaphragm mounted on said frame, a post centrally mounted on said diaphragm, a second diaphragm mounted on said frame in parallel alignment with said first-mentioned diaphragm, a post centrally mounted on said second-mentioned diaphragm in axial alignment with said first post, a bore in said frame adjacent each of said diaphragms, a screw in each of said bores, a spring connected to each of said screws and the adjacent diaphragm, a liquid pressure conduit in the form of a symmetrical loop connected across the ends of said frame, one end of said conduit communicating with a side of one of said diaphragms, the other end of said conduit communicating with the opposite side of said second diaphragm, liquid in said loop, wire mountings on each of said posts and an electrical resistance strain wire stretched in tension between and mounted upon said wire mountings.

5. A transducer comprising a first movable member, a second movable member, each of said members including a spring mass, said masses having substantially equal natural frequencies, said masses being held in spaced-apart relation, a pressure chamber adjacent each of said movable members, each of said pressure chambers having substantially the same volume, a liquid pressure connection with each of said chambers, liquid in said connection and said chambers, an electrical resistance strain wire, and connections between said strain wire and each of said movable members, said strain wire being stretched in tension between said movable members.

6. A transducer comprising a first movable member, a second movable member, a third member, each of said movable members including a spring mass resiliently connected to the third member, said masses being held in spaced-apart relation on such resilient connection, a liquid pressure means connected to each of said movable members, an electrical resistance strain wire, connections between said strain wire and each of said movable members, said strain wire being stretched in tension between said movable members.

7. A transducer comprising a first movable member, a second movable member, a third member, each of said movable members including a spring mass resiliently connected to the third member, said movable members having substantially equal masses and having a substantially equal spring rate for the said spring masses, said masses being held in spaced-apart relation on said resilient connection, a pressure chamber adjacent each of said movable members, each of said pressure chambers having substantially the same volume, a liquid pressure means connected to each of said chambers, an electrical resistance strain wire, and connections between said strain wire and each of said movable members, said strain wire being stretched in tension between said movable members.

8. A transducer comprising a relatively fixed member, a first movable member, movable with respect to said fixed member, a yieldable connection between said fixed member and said first movable member, a second movable member, a yieldable connection between said second movable member and said fixed member, said yieldable connections holding said movable members separated from each other and movable with respect to each other, and each of said movable members being movable with respect to said fixed member, a liquid pressure conduit, one end of said conduit being connected to one side of said first movable member and the other end being connected to the opposite side of said second movable member, liquid in said conduit, an electrical resistance strain wire, and connections between said strain wire and each of said movable members, said strain wire being stretched in tension between said movable members.

9. A transducer comprising a relatively fixed member, a first movable member, movable with respect to said fixed member, a yieldable connection between said fixed member and said first movable member, a second movable member, a yieldable connection between said second movable member and said fixed member, said yieldable connections holding said movable members separated from each other and movable with respect to each other, and each of said movable members being movable with respect to said fixed member, the mass of said yieldably connected members being substantially equal and said yieldable connections having substantially equal spring rates, a pressure chamber adjacent each of said movable members, each of said pressure chambers having substantially the same volume, a liquid pressure conduit in the form of a symmetrical loop, one end of said conduit being connected to one of said pressure chambers and to one side of the adjacent movable member, the other end being connected to said other pressure chamber and the other side of said second movable member, liquid in said conduit and said pressure chambers, an electrical resistance strain wire, and connections between said strain wire and each of said movable members, said strain wire being stretched in tension between said movable members.

10. A motion-sensing device comprising a pair of pressure chambers, said pressure chambers having substantially equal volumes, a liquid connection between said chambers, each of said chambers having a fixed end wall and a diaphragm closure on the opposite end wall of each of said chambers, liquid in said chambers and against a side of each of said diaphragms, said diaphragms being positioned on opposite ends of said chambers and said diaphragms being aligned opposite to each other, and a motion-responsive device responsive to the motion of each of said diaphragms whereby, on acceleration of said motion-sensing device, a variation in pressure occurs in each of said chambers, said diaphragms both moving together and both in the same direction.

11. In the motion-sensing device of claim 10, said motion-responsive device comprising an electrical resistance strain wire and a wire mounting connected to opposite sides of said diaphragms.

References Cited in the file of this patent

UNITED STATES PATENTS

| | | |
|---|---|---|
| 2,455,883 | Statham | Dec. 7, 1948 |
| 2,507,501 | Clark | May 16, 1950 |
| 2,641,131 | Waugh | June 9, 1953 |